(12) United States Patent
Tafoya et al.

(10) Patent No.: US 9,917,411 B2
(45) Date of Patent: Mar. 13, 2018

(54) DOUBLE FIBER OPTIC MODE ADAPTER

(71) Applicant: Optical Engines, Inc., Colorado Springs, CO (US)

(72) Inventors: Jason D. Tafoya, Colorado Springs, CO (US); Daniel Scott Schulz, Colorado Springs, CO (US); Donald L. Sipes, Jr., Colorado Springs, CO (US)

(73) Assignee: OPTICAL ENGINES, INC., Colorado Springs, CO (US)

( * ) Notice: Subject to any disclaimer, the term of this patent is extended or adjusted under 35 U.S.C. 154(b) by 0 days.

(21) Appl. No.: 15/191,829

(22) Filed: Jun. 24, 2016

(65) Prior Publication Data

US 2017/0214209 A1   Jul. 27, 2017

Related U.S. Application Data

(60) Provisional application No. 62/184,339, filed on Jun. 25, 2015, provisional application No. 62/186,745, filed on Jun. 30, 2015.

(51) Int. Cl.
*H01S 3/067* (2006.01)
*G02B 6/26* (2006.01)
(Continued)

(52) U.S. Cl.
CPC ...... *H01S 3/06745* (2013.01); *H01S 3/06712* (2013.01); *H01S 3/06741* (2013.01); *H01S 3/06783* (2013.01); *H01S 3/094003* (2013.01); *H01S 3/094053* (2013.01); *G02B 6/262* (2013.01); *G02B 6/264* (2013.01); *G02B 2006/12195* (2013.01)

(58) Field of Classification Search
CPC ............ G02B 6/262; G02B 6/264; G02B 2006/12195; H01S 3/06754
See application file for complete search history.

(56) References Cited

U.S. PATENT DOCUMENTS

| 6,456,637 B1 * | 9/2002 | Holcomb | H01S 3/0675 |
| | | | 359/341.3 |
| 8,818,151 B1 * | 8/2014 | Ward | G02B 6/264 |
| | | | 264/1.28 |

(Continued)

FOREIGN PATENT DOCUMENTS

WO   WO2015/019692 A1 *  2/2015

*Primary Examiner* — Eric L Bolda
(74) *Attorney, Agent, or Firm* — Leydig, Voit & Mayer, Ltd.

(57) ABSTRACT

An exemplary embodiment of the disclosure provides a double fiber optic mode adapter including: a fiber core having a variable core diameter; a fiber cladding having a variable cladding size; a first input interface corresponding to a first core diameter and a first cladding size; a second input interface corresponding to a second core diameter and a second cladding size; a thermally-tapered region wherein the variable core diameter of the fiber core transitions from the first core diameter to the second core diameter and the variable cladding size of the fiber cladding transitions from the first cladding size to a third cladding size; and an etched tapered region wherein the variable core diameter of the fiber core is constant and the variable cladding size of the fiber cladding transitions from the third cladding size to the second cladding size.

3 Claims, 3 Drawing Sheets

(51) Int. Cl.
*H01S 3/094* (2006.01)
*G02B 6/12* (2006.01)

(56) References Cited

U.S. PATENT DOCUMENTS

| | | | |
|---|---|---|---|
| 2002/0094159 A1* | 7/2002 | Goldberg | H01S 3/067 385/27 |
| 2007/0280597 A1* | 12/2007 | Nakai | G02B 6/2835 385/43 |
| 2015/0126982 A1* | 5/2015 | Neuberger | H01S 3/06745 606/11 |
| 2016/0109656 A1* | 4/2016 | Duesterberg | G02B 6/262 385/29 |
| 2016/0161674 A1* | 6/2016 | Tanaka | G02B 6/262 385/24 |

* cited by examiner

DOUBLE FIBER OPTIC MODE ADAPTER

CROSS-REFERENCE TO RELATED APPLICATIONS

This patent application claims the benefit of U.S. Provisional Patent Application No. 62/184,339, filed Jun. 25, 2015, and U.S. Provisional Patent Application No. 62/186,745, filed Jun. 30, 2015, which are both incorporated by reference in their entireties.

STATEMENT REGARDING FEDERALLY SPONSORED RESEARCH AND DEVELOPMENT

This invention was made with Government support under Grant Number FA9451-13-M-0334 awarded by the Air Force Research Laboratory. The Government has certain rights in this invention.

BACKGROUND

Fiber optic mode adapters are fiber devices that provide a transition that allows for the efficient transfer of optical power from one type of fiber to another. Single-core mode adapters, which, for example, match single mode fibers with 10 µm cores to those of 20 µm cores, are commercially available.

SUMMARY

In an exemplary embodiment, the invention provides a double fiber optic mode adapter, comprising: a fiber core having a variable core diameter; a fiber cladding having a variable cladding size; a first input interface corresponding to a first core diameter and a first cladding size; a second input interface corresponding to a second core diameter and a second cladding size; a thermally-tapered region wherein the variable core diameter of the fiber core transitions from the first core diameter to the second core diameter and the variable cladding size of the fiber cladding transitions from the first cladding size to a third cladding size; and an etched tapered region wherein the variable core diameter of the fiber core is constant and the variable cladding size of the fiber cladding transitions from the third cladding size to the second cladding size.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
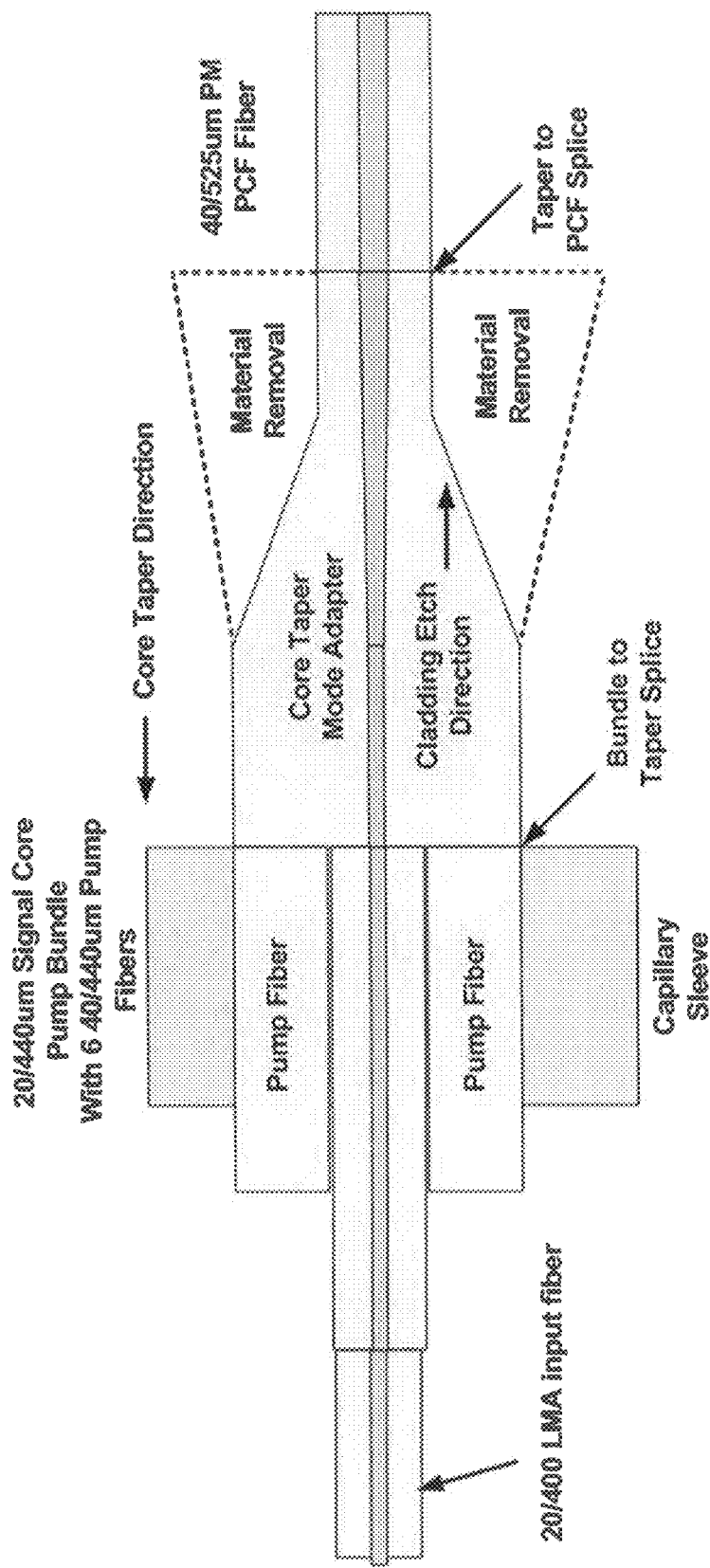
FIG. 1 is a schematic diagram illustrating an exemplary double fiber optic mode adapter.

In fiber lasers and fiber amplifiers, it is desirable not only to match signal core light but also to match pump light into a double-clad fiber laser or amplifier gain fiber. Exemplary embodiments of the invention relate to a double fiber optic mode adapter for matching fibers having different core diameters as well as differing clad dimensions.

A laser of any type is characterized by three key constituents: a gain medium that has an element with an atomic structure characterized by long lived upper electron states, a pump source whose energy is such that the substance in the gain medium can be excited to this upper state, and either a mirrored resonator structure to create an oscillator, or an input source to create an amplifier. A fiber laser or amplifier is a subset of this definition where the pump source is a laser diode and the gain medium is typically a Rare Earth doped glass with a fiber optic guiding structure. A fiber laser or amplifier can be created by way of a double clad fiber: there is a fiber optic core typically in the 5-50 um diameter range with low numerical aperture such that a laser propagating mode of typical of near diffraction limited beam quality. Surrounding this central fiber signal propagation core is another guiding region typically in the 100 um to 500 um in diameter and is typically of high numerical aperture. In this way the pump light is injected into this cladding guided region of the fiber and as it propagates, portions pass through the rare earth doped core where it is absorbed. In this way the fiber laser or fiber amplifier is pumped to create the conditions necessary for laser action.

A major challenge towards creating laser amplifiers is delivering both the signal input light and the pump light to the gain medium in an efficient manner where it can propagate down the length of the fiber. There is often a large mismatch in fiber core diameter between the input signal and the gain fiber. Simply splicing these two dissimilar fibers together will result in transition with unacceptable loss. To smooth this transition, exemplary embodiments of the invention provide a double mode adapter where the fiber with the larger core is thermally tapered downward such that the diameter is reduced to match the diameter of the smaller fiber core. If this transition is made not too abruptly, the light from the smaller core can grow to match the larger core and transfer efficiently to the larger core fiber. Efficient coupling of pump and signal light into the gain portion of the fiber amplifier typically involves transitioning a small core fiber from the input into a larger core in the gain fiber. At the same time, exemplary embodiments of the invention provide for transforming the larger diameter low numerical aperture (NA) of the pumps into the smaller diameter and higher NA of the pump cladding.

To accomplish this, exemplary embodiments utilize two techniques at different portions of a double mode adapter. The first involves thermal tapering where heat is applied to the fiber and when the fiber gets close to its melting point the fiber is pulled and both the core and the clad of the fiber are reduced by the same proportion. The other technique involves etching the outside of the fiber in a way that the outer diameter of the fiber is reduced while the core is left untouched. By using these techniques together, embodiments of the invention provide for the advantage of being able to transform the core and the clad independently of each other to satisfy the transition requirements for both the pump and the signal.

One exemplary approach considered by the inventors for creating a double fiber optic mode adapter involved creating a single taper that combines both the tapering of the core and the opposite etching of the cladding to achieve both mode adaptations. In this approach, the transition fiber is thermally tapered to match the input signal, with the thermally-tapered cladding then being etched to provide the proper transition for the pump light in the cladding.

FIG. 1 is a schematic diagram illustrating an exemplary double fiber optic mode adapter 100 based on this approach. The double fiber optic mode adapter may also be referred to as a double taper mode adapter or double taper pump combiner. In this example, a 20 µm core fiber from a prior amplifier stage is expanded to a mode field compatible with low loss coupling with a 40 µm core Photonic Crystal Fiber (PCF) fiber. The resulting tapered fiber is then etched with an adiabatic shape to achieve a desired pump taper.

Studying the approach of FIG. 1, however, has led to the conclusion that it may be relatively difficult to etch the proper adiabatic taper on top of a thermal taper, and there may be certain instabilities associated therewith.

Figure 2:
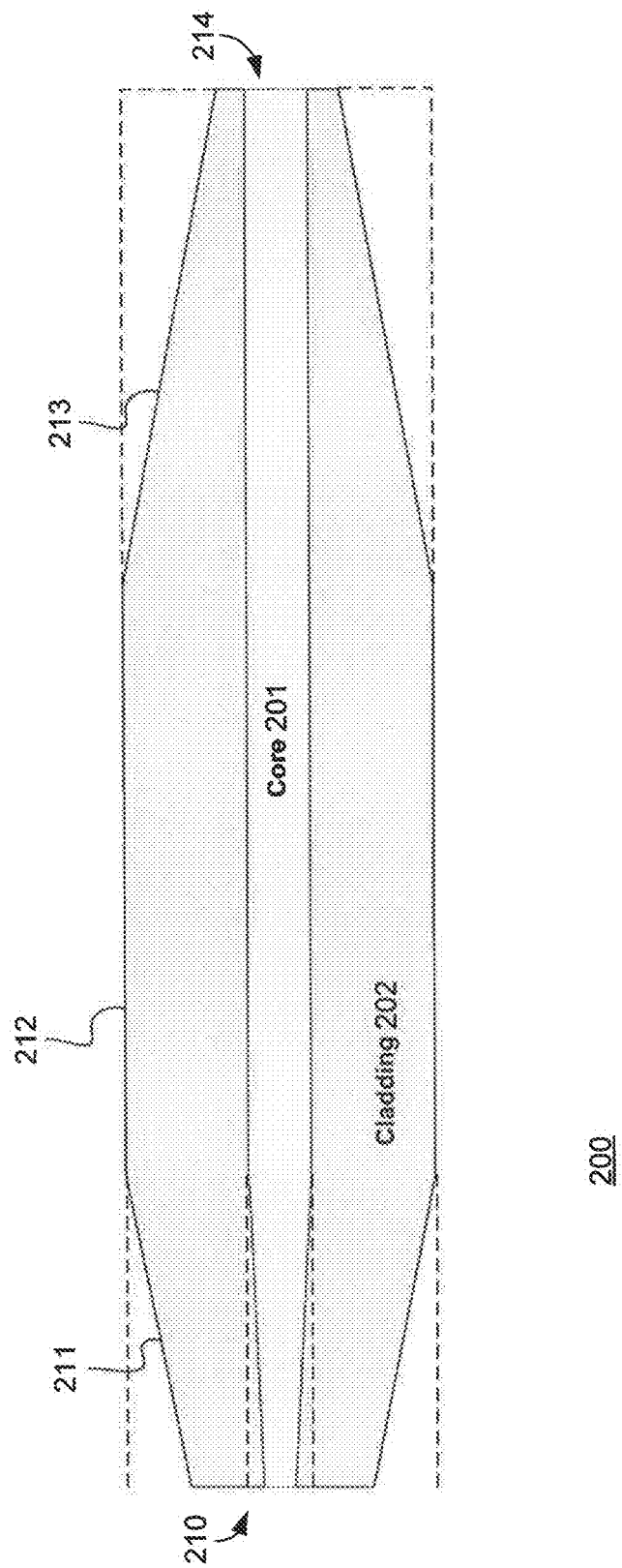
FIG. 2 is a schematic diagram illustrating an exemplary double fiber optic mode adapter in an exemplary embodiment of the invention.

FIG. 2 is a schematic diagram illustrating an exemplary double fiber optic mode adapter 200 in an exemplary embodiment of the invention, with separate thermal taper and etched taper regions. By providing separate regions, the difficulties of trying to etch an adiabatic taper on top of a thermal taper are avoided. The exemplary double fiber optic mode adapter 200 may further include an original fiber region, but it will be appreciated that the original fiber region is not required.

In FIG. 2, in the thermal taper region 211, the cladding 202 is tapered with the core 201 (via thermal tapering) such that the core 201 matches the core of an input signal fiber (not depicted) at input face 210 In the etched taper region 213, the cladding 202 is tapered to match the cladding dimensions of a PCF gain fiber (not depicted), which may be, for example, an air-clad PCF gain fiber, while the core 201 in the etched taper region 213 is unaffected by the tapering in the etched taper region 213 (via etching). The double fiber optic mode adapter 200 may further include an original fiber region 212 where neither the core 201 nor the cladding 202 is tapered.

Based on the structure depicted in FIG. 2, pump light adiabatically expands in the thermal taper region 211 and contracts in the etched taper region 213, while the signal light in the fiber core 201 also expands adiabatically in the thermal taper region 211 but is unchanged in the etched taper region 213. By appropriate application of the thermal tapering and etching shown in FIG. 2, the resulting ratios of core to clad diameters can be achieved over a wide range of ratios.

Figure 3:
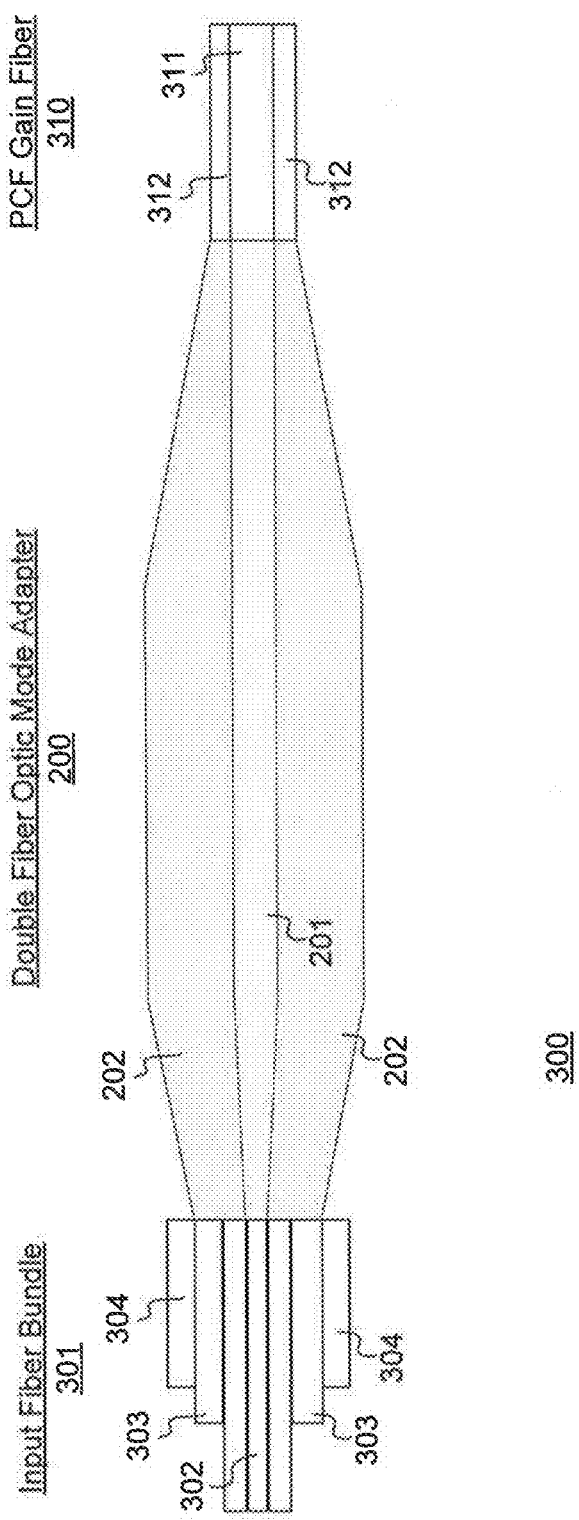
FIG. 3 is a schematic diagram illustrating an exemplary environment for an exemplary double fiber optic mode adapter in an exemplary embodiment of the invention.

FIG. 3 illustrates an exemplary environment 300 in which the double fiber optic mode adapter 200 may be used. In this exemplary environment, for the input face 210 of double fiber optic mode adapter 200, the cladding diameter of the double fiber optic mode adapter 200 is set to match an input pump bundle such that pump fibers 303 are configured to input pump light into cladding 202, and the core diameter for core 201 of the double fiber optic mode adapter 200 is set to match the core diameter for core 301 of an input signal fiber of the input pump bundle. This may be achieved via thermal tapering in the thermal taper region 211 of the double fiber optic mode adapter 200. It will be appreciated that the thermal tapering causes the dimensions of both the cladding 202 and the core 201 of the transition fiber forming the double fiber optic mode adapter 200 to become smaller. It will further be appreciated that the cladding diameter may set to be slightly larger than the diameter of the cores of the pump fibers to allow some tolerance (but not so much larger that the brightness or Etendue is unnecessarily lost).

For the output face 214, the cladding diameter for cladding 202 of the double fiber optic mode adapter 200 is set to match the cladding 312 of a PCF gain fiber 310, and the core diameter for core 201 of the double fiber optic mode adapter 200 matches the core diameter for core 311 of the PCF gain fiber 310. This may be achieved through etching in the etched taper region 213 of the double fiber optic mode adapter 200. It will be appreciated that the etching is applied to the cladding of the transition fiber forming the double fiber optic mode adapter 200 and leaves the core of the transition fiber forming the double fiber optic mode adapter 200 unchanged. It will further be appreciated that the pump fibers 303 may be surrounded by a capillary sleeve 304, which should be collapsed around the pump fibers 303 in a way that does not distort the fiber leading to loss of pump signal or poor transitioning of the signal light into the gain fiber.

In the original fiber region 212, the core diameter of the double fiber optic mode adapter 200 matches the core diameter of the PCF gain fiber at the output face 214. In an exemplary implementation, the cladding diameter in the original fiber region 212 is simply the original diameter of the transition fiber used for the double fiber optic mode adapter 200 (i.e., the diameter of the transition fiber without being subjected to thermal tapering or etching), in this exemplary implementation, the size of the transition fiber used for the double fiber optic mode adapter 200 is selected based on the transition that needs to be accomplished between the input signal fiber and the core of the PCF gain fiber such that thermally tapering the transition fiber at the input face 200 causes both the cladding and the core of the transition fiber to match the input pump bundle.

In an exemplary implementation, the input fiber bundle 301 may be a 20/240 µm signal core with six 220/240 µm 0.22 NA pump fibers, and the PCF fiber may be a 30/400 µm 0.55 NA Air Clad polarization-maintaining (PM) PCF fiber. In another exemplary implementation, a double mode adapter may provide an efficient transition between the pump and signal combined on a 10/125 um 0.22 NA fiber to a 40/200 um 0.55 NA PCF type gain fiber.

In an exemplary embodiment, to produce the double fiber optic mode adapter 200 depicted in FIG. 2, a transition fiber is provided that begins with a signal core matched to a PCF gain fiber core and that has a cladding that will match an input fiber bundle after thermal tapering. The transition fiber is then thermally tapered on the input side to match the input fiber bundle signal core (e.g., a 20 µm step index fiber (SIF). This transition fiber is then taper etched such that the output outer diameter will match the Air Clad diameter of the PCF gain fiber.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A double fiber optic mode adapter, comprising:
   a fiber core having a variable core diameter;
   a fiber cladding having a variable cladding size;
   a first input interface corresponding to a first core diameter and a first cladding size;
   a second input interface corresponding to a second core diameter and a second cladding size;
   a thermally-tapered region wherein the variable core diameter of the fiber core transitions from the first core diameter to the second core diameter and the variable cladding size of the fiber cladding transitions from the first cladding size to a third cladding size; and
   an etched tapered region wherein the variable core diameter of the fiber core is constant and the variable cladding size of the fiber cladding transitions from the third cladding size to the second cladding size.

2. The double mode adapter according to claim 1, wherein the first input interface is connected to an input fiber bundle.

3. The double mode adapter according to claim 1, wherein the second input interface is connected to a photonic crystal fiber (PCF) gain fiber.

* * * * *